United States Patent [19]

Hunt

[11] Patent Number: 5,213,823
[45] Date of Patent: May 25, 1993

[54] TURNUP BLADDER HAVING OUTER LAYER OF PVC/ACRYLONITRILE BUTADIENE RUBBER BLEND

[75] Inventor: Jerry D. Hunt, North Canton, Ohio

[73] Assignee: The Goodyear Tire & Rubber Company, Akron, Ohio

[21] Appl. No.: 854,935

[22] Filed: Mar. 20, 1992

[51] Int. Cl.$^5$ ............................................. B32B 27/08
[52] U.S. Cl. ................................... 425/521; 152/511; 156/401; 525/233; 428/519; 428/520
[58] Field of Search .................... 156/401; 525/233; 152/511; 428/519–521

[56] References Cited

U.S. PATENT DOCUMENTS

| | | | |
|---|---|---|---|
| 3,932,255 | 1/1976 | Saracsan | 156/401 |
| 3,993,607 | 11/1976 | Florence | 260/2.5 FP |
| 4,087,307 | 5/1978 | Head et al. | 156/401 |
| 4,163,683 | 8/1979 | Lammlein, Jr. | 156/136 |
| 4,547,544 | 10/1985 | Allardice | 524/267 |
| 4,790,365 | 12/1988 | Sandstrom et al. | 152/510 |

*Primary Examiner*—Edith Buffalow
*Attorney, Agent, or Firm*—Henry C. Young, Jr.

[57] ABSTRACT

A turnup bladder for use in tire making as an outside surface coating which is a release coating that also imparts improved durability and cut resistance. This outside surface coating is an elastomeric polymer blend containing from about 10 to about 60, preferably from about 40 to about 60 parts by weight of polyvinyl chloride and from about 40 to about 90, preferably about 40 to about 60 parts by weight of an acrylonitrile-butadiene rubber per 100 parts of polymer wherein the acrylonitrile-butadiene rubber comprises from about 25 to about 40 parts by weight of acrylonitrile and from about 60 to about 75 parts by weight of butadiene per 100 parts of said acrylonitrile-butadiene rubber.

8 Claims, 1 Drawing Sheet

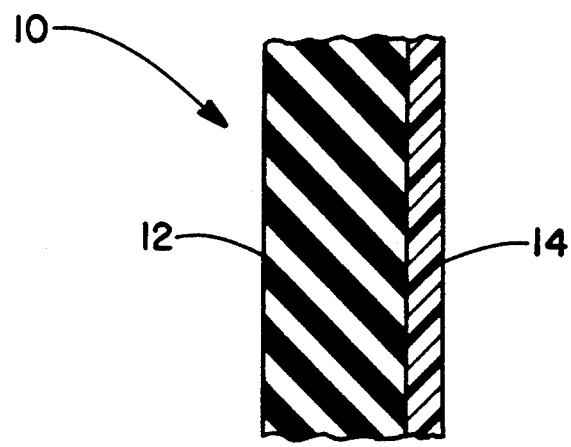

TURNUP BLADDER HAVING OUTER LAYER OF PVC/ACRYLONITRILE BUTADIENE RUBBER BLEND

TECHNICAL FIELD

This invention relates to bladders and in particular to turnup bladders used in tire building. More particularly, this invention relates to an improved turnup bladder having improved release properties and cut resistance, in which at least the outside surface portion is made of a polyvinyl chloride/rubber blend having improved release and cut resistance properties.

BACKGROUND OF THE INVENTION

In the manufacture of a radial tire with equipment such as is used in current practice, it is common practice to first make a tire bead assembly which includes an inextensible bead core, an apex, and a gum tie strip. The edges of the gummed tie strip are turned up so that they abut the sides of the apex. An apparatus which includes an inflatable bladder is typically used for this purpose. The completed bead assembly in which the rubber is in the uncured state is then inserted into a tire onto a tire building machine. During tire building, the lateral edges of the carcass plies are turned up around the bead wires. An inflatable bladder, commonly known as a turnup bladder, is used to accomplish this. The rubbers forming the various tire components, including the carcass rubber and any rubber coating which surrounds the bead wires, are in the uncured or green state at this point in the manufacturing process. Turnup is typically carried out at ambient temperature (approximately 0°-30° C.).

A representative apparatus for forming a bead assembly, which apparatus includes an inflatable bladder for turning up the edges of the gum strip is shown, for example, in U.S. Pat. No. 4,163,683 to Lammlein.

A turnup bladder must be elastomeric in nature, i.e., it must have high elongation at break and must be capable of returning substantially to its original dimensions when stress is removed, since during its lifetime it will be subject to repeated inflation and deflation. In addition, turnup bladders should have high durability, good cut resistance, and the outside surface should have good release properties, so as to minimize or eliminate sticking of the uncured rubber of tire components to the outside surface of the turnup bladder. A bladder used in forming a tire bead assembly must also posses these characteristics.

A conventional turnup bladder comprises an outside layer of a polyurethane bonded to a base or core of a conventional diene rubber such as natural rubber (which is cis-1,4-polyisoprene), SBR (styrene-butadiene rubber) or a blend thereof. Other surface layer materials, such as polysiloxane having good release properties have also been suggested as a bladder material in U.S. Pat. No. 4,547,544 to Allardice.

Polyurethane-coated bladders have poorer release properties (i.e., greater adherence of uncured rubber to the polyurethane coating) and poorer cut resistance than what is desirable. Bladders made with other outer surface coating materials likewise have release properties and cut resistance which leaves something to be desired.

DISCLOSURE OF THE INVENTION

The present invention provides a bladder, useful in ambient temperature fabrication of rubber parts and components, having excellent release properties and improved cut resistance. The bladder of the present invention has at least an outside surface which is an elastomeric polymer blend containing from about 10 to about 60 parts by weight of polyvinyl chloride and from about 40 to about 90 parts by weight of an acrylonitrile-butadiene rubber per 100 parts of polymer, wherein acrylonitrile-butadiene rubber comprises from about 10 to about 45 parts by weight of acrylonitrile and from about 55 to about 90 parts by weight of butadiene per 100 parts of said acrylonitrile-butadiene rubber.

Material forming the surface, as above described, is an elastomeric material having elongation at break of at least 400%, 300% modulus from about 8 to about 14 megapascals (MPa), and adhesion of 10 to 100 pounds per inch as measured to itself or to a rubber base or core compound.

BRIEF DESCRIPTION OF THE DRAWINGS

The sole figure of drawing is a fragmentary cross-sectional view of a turnup bladder according to a preferred embodiment of this invention.

PRACTICE OF THE INVENTION

The present invention provides an inflatable bladder, useful in making rubber articles and in particular parts or components of a pneumatic tire, which has excellent release properties (particularly in contact with uncured rubber at ambient temperature), high cut resistance and high durability in addition to basic elastomeric qualities, e.g., high elongation at break and virtually 100% return to original dimensions when inflated and deflated. This is accomplished by providing a bladder wherein the material forming the outside surface is an elastomeric polymer blend of polyvinyl chloride (PVC) and a rubber as summarized above and will be fully described below. This high release composition may form either an outside surface layer or the entire bladder. The former is preferred, and this invention will be described with particular reference to a bladder of this type.

Referring now to the sole figure of drawing, 10 shows a turnup bladder used in tire making, which has a sulfur-cured rubber base or core 12 and a high release outside layer 14 bonded thereto. This high release outside layer 14 is made of a high release material in accordance with this invention. The outside layer 14 may be directly bonded to the base or core 12.

The base 12 may be of conventional composition and may be formed of any suitable sulfur cured diene rubber, such as natural rubber (which is essentially cis-1,4-polyisoprene), styrene-butadiene rubber (SBR) or a blend of the two. Other rubbers are blends thereof as known in art may be used. Basically, this base layer should be elastomeric, should be capable of repeated inflation and deflation with good resistance to flex crack and virtually 100% return to original dimensions.

The outer surface layer 14 should be formed of a material having high elongation at break, satisfactory 100% modulus, good release properties, and high cut resistance. In particular, high elongation at break should equal or exceed 400%; 300% modulus should be from about 8 to about 14 MPa. This is achieved by providing, as the material of the outside layer 14, a cured elastomeric composition which is a mixture or blend of (1) polyvinyl chloride and (2) an acrylonitrile-butadiene rubber or mixture thereof, plus plasticizer and rubber compounding ingredients which may be conventional.

The polyvinyl chloride polymer content constitutes about 10 to about 60 parts by weight, preferably about 40 to about 60 parts by weight, based on 100 parts of total polymer in the blend.

The rubber of layer 14 is an acrylonitrile-butadiene rubber or mixture thereof. Especially preferred rubber is acrylonitrile-butadiene rubber containing from about 10 to about 45 parts by weight of acrylonitrile and conversely from about 55 to about 90 parts by weight of butadiene preferably from about 25 to about 40 parts by weight of acrylonitrile and from about 60 to about 75 parts by weight of butadiene, per 100 parts of rubber. Another lower aliphatic diene, e.g., isoprene, can replace or partially replace butadiene if desired. The acrylonitrile-butadiene rubber constitutes about 40 to about 90 parts by weight, preferably about 40 to about 60 parts by weight, based on 100 parts of total polymer in the blend.

Suitable blends of polyvinyl chloride and acrylonitrile-butadiene rubber are available commercially. A preferred blend is one sold, for example, by Uniroyal, Inc. of Middlebury, Conn., U.S.A. under the trademark, "Paracril OZO" 50, which is a 50—50 mixture of polyvinyl chloride homopolymer and an acrylonitrile-butadiene rubber having approximately 30% acrylonitrile and 70% butadiene, all parts and percentages being by weight. "Paracril OZO" is a registered trademark of Uniroyal, Inc. The composition of "Paracril OZO-50" is given above is as described in U.S. Pat. No. 3,993,607 to Florence.

The material forming outer layer 14 also contains a plasticizer or mixture thereof. A preferred plasticizer is a blend of paraffinic, naphthenic and aromatic hydrocarbons. This oil is described as ASTM type 103. The amount of plasticizer must be sufficient to plasticize the polyvinyl chloride and thereby render the overall composition flexible and elastomeric. The amount of plasticizer is normally from about 1 to about 40 parts by weight per 100 parts of total polymer weight. The plasticizer may include a tackifying agent; if not, a separate tackifying agent should be added.

The material forming outer layer 14 also normally contains conventional rubber compounding agents in conventional amounts. These may include, for example, about 20 to about 80 PHR of silica, about 2 to about 10 PHR zinc oxide, about 0.5 to about 6 PHR accelerator(s) and about 0.5 to about 5.0 PHR sulfur. (Sulfur can be omitted when the accelerator package includes a sulfur donor). Throughout the specification and claims, PHR shall denote composition based on total polymer weight, i.e., the sum of PVC and rubber.

The material forming outer layer 14 of the turnup sleeve can be calendered and applied as a thin laminate to the base rubber 12 of the turnup sleeve 10 by conventional means and cured in a conventional manner. No adhesive is required in order to cause the PVC/rubber composition to adhere to the base rubber. The thickness of the outer layer 14 after curing is from about 0.01 to about 0.1 inch (about 0.025 to about 0.25 cm). In a preferred embodiment of this invention, bladder 10 described herein forms a turnup bladder in a tire forming apparatus, such as bladder 42 in the apparatus shown and described in the above cited U.S. Pat. No. 4,163,684 to Lammlein, Jr. In fact, the composite rubber article 10 shown herein is generally useful as a material for rubber articles which are subjected to repeated flexure and which therefore must have high durability and fatigue resistance, and which also should have an outer surface or outer layer that has good release properties when in contact with uncured rubber.

It is possible to form the entire bladder 10, and not just the outer surface layer of the PVC/rubber composition described above. This is not preferred, however, since the laminate structure shown in the drawing possess the desirable physical qualities of the base rubber (e.g., high elongation, comparatively low modulus) and the desirable qualities, such as low adhesion to uncured rubber, good cut resistance, and improved durability which are imparted by the PVC/rubber layer 14.

This invention will now be described in greater detail with reference to the example which follows.

EXAMPLES

This example describes a typical compound in accordance with this invention.

A compound having the following composition was prepared:

| Paracril Ozo 50 | 100 PHR |
|---|---|
| "Hi-Sil" 233 (silica) | 50 PHR |
| Zinc Oxide | 5 PHR |
| Plasticizer | 18 PHR |
| Accelerators | 5 PHR |

The above compound was formed into a sheet 0.03 inch (about 0.076 cm) thick. This sheet and an uncured rubber base stock sheet were calendared separately and then laminated together and cured under heat and pressure.

The laminate sheet thus prepared was tested and was found to have elongation and modulus values in the ranges above described. The sheet was also found to have satisfactory adhesion both to itself and to a cured rubber sheet. Strebler adhesion testing was done to determine the interfacial adhesion of a sheet of the test compound both to itself and to a cured rubber sheet. The interfacial adhesion was determined by pulling one compound away from another at a right angle to the untorn test specimen with the two ends being pulled apart a 180° angle to each other using an Instron machine. The area of contact was determined from placement of a Mylar sheet between the compounds during cure. A window in the Mylar sheet allowed the two materials to come into contact with each other during testing. This test is more fully described in U.S. Pat. No. 4,790,365.

While this invention has been described with particular reference to the best mode and preferred embodiment thereof, it shall be understood that this description is by way of illustration and not limitation and that variations can be made without departing from the scope and spirit of this invention.

What is claimed is:

1. An inflatable bladder for use in making a rubber article wherein the materials forming at least the outside surface of said bladder is an elastomeric polymer blend containing from about 10 to about 60 parts by weight of polyvinyl chloride from about 40 to about 90 parts by weight of a acrylonitrile-containing rubber per 100 parts of polymer, wherein said rubber comprises from about 10 to about 45 parts by weight of acrylonitrile and from about 55 to about 90 parts by weight of a lower aliphatic diene per 100 parts of said acrylonitrile-containing rubber.

2. An inflatable bladder according to claim 1 wherein said lower aliphatic diene is butadiene.

3. An inflatable bladder according to claim 1 wherein said acrylonitrile-containing rubber is acrylonitrile-butadiene rubber.

4. An inflatable bladder according to claim 3 wherein said acrylonitrile-butadiene rubber comprises from about 25 to about 40 parts by weight of acrylonitrile and from about 60 to about 75 parts by weight of butadiene.

5. An inflatable bladder according to claim 1 wherein said elastomeric polymer blend contains from about 40 to about 60 parts by weight of polyvinyl chloride and from about 40 to about 60 parts by weight of an acrylonitrile-diene rubber per 100 parts of polymer, wherein said rubber comprises from about 25 to about 40 parts by weight of acrylonitrile and from about 60 to about 75 parts by weight of a lower aliphatic diene per 100 parts of said acrylonitrile-butadiene rubber.

6. An inflatable bladder according to claim 5 wherein said lower aliphatic diene is butadiene.

7. An inflatable bladder according to claim 1 wherein said elastomeric polymer blend contains from about 1 to about 40 parts by weight of plasticizer.

8. A cured rubber article comprising a cured diene rubber base and a thin outside surface layer thereon, the material forming said outside surface layer being an elastomeric polymer blend having the composition as specified in claim 1.

* * * * *